United States Patent Office 3,455,842
Patented July 15, 1969

3,455,842
CRACKING CATALYST COMPRISING
ALUMINUM ZEOLITE
Edward B. Cornelius, Swarthmore, James E. McEvoy, Morton, and George Alexander Mills, Swarthmore, Pa., assignors to Air Products and Chemicals, Inc., Philadelphia, Pa., a corporation of Delaware
No Drawing. Filed Feb. 20, 1964, Ser. No. 346,104
The portion of the term of the patent subsequent to Aug. 22, 1984, has been disclaimed
Int. Cl. B01j 11/40
U.S. Cl. 252—455                                3 Claims

ABSTRACT OF THE DISCLOSURE

In cracking gas oil, most (80–95%) of the catalyst is an attrition resistant, iron-free, porous clay refractory carrier, and the active sites are attributable to zeolite Y, most of the ion-exchange capacity of which has been transformed to aluminum zeolite Y. Ammonium exchange may remove sodium, followed by controlled aluminum exchange of the ammonium zeolite. Steaming of the aluminum-exchanged composite at 700–750° C. for 2–6 hours provides the stable catalyst.

---

This invention relates to the production of cracking catalyst containing material derived from a molecular sieve type of zeolite material.

As explained in "Molecular Sieve Catalyst in Hydrocarbon Reactions" by J. A. Rabo et al. in the Proceedings of the International Catalyst Conference, Paris, 1960, a catalyst containing 0.5% platinum on a calcium form of zeolite Y has effectiveness at 375° C. for the isomerization of hexane to isohexane. Said article by Rabo et al. also explains the platinum containing catalysts supported on carriers such as the magnesium, zinc, manganese, strontium, aluminum and cerium derivatives of zeolite Y function at 400° C. as hexane isomerization catalysts. Notwithstanding the publicity given to such Rabo et al. article, the petroleum refineries and catalyst cracking manufacturers encountered difficulty in developing a hydrocarbon conversion catalyst featuring derivatives of sodium zeolite Y and meeting the industrial requirements for catalyst for petroleum refineries.

In accordance with the present invention, cracking catalyst particles are prepared by a series of steps including a step of bonding together 80–95% clay and 5–20% aluminum zeolitic molecular sieve into particles, treating such particles at temperatures effective in transforming the clay into a rugged porous carrier, and transforming the thus prepared particles into useful cracking catalyst particles by treatment with an atmosphere containing from 10% to 100% steam at a temperature within the range from 700° C. to 750° C. for from 2 to 6 hours.

A preferred molecular sieve in zeolite Y. Instead of zeolite Y, interesting results (though not necessarily as advantageous as the results obtained with the preferred zeolite Y) might be obtained by the use of any crystalline aluminum zeolitic molecular sieve having, in the aluminum form, an average pore diameter within the range from 10 to 18 angstroms, and containing in the alkali derivative form a silicon atom to aluminum atom ratio gear than 1.5 but less than 8. When the formulas of the sodium forms of the molecular sieves are expressed as ratios of metal oxides, the generic description of those of interest to the present invention can be stated as:

$$QNa_2O:Al_2O_3:WSiO_2:XH_2O$$

in which Q is more than 0.2 but less than 1.1, W is from 2.5 to 16, and X is up to 9. The preferred zeolite Y has values of from 0.7 to 1.1 for Q, and values of from 3 to 5 for W.

A catalyst evaluation procedure as described in Cornelius et al. 3,337,474.

The nature of the invention is further clarified by reference to the following examples:

EXAMPLE I

A cracking catalyst was prepared by subjecting sodium zeolite Y to ion exchange to replace a major amount of the sodium with ammonium ions, and the ammonium zeolite Y was thereafter treated with a solution of aluminum nitrate to prepare an aluminum zeolite Y material. This aluminum zeolite Y was mixed with a plastic kaolin known as an Edgar plastic kaolin and extruded into pellets containing, on a dry basis, 10% material derived from the aluminum molecular sieve material. The catalyst particles were activated for 4 hours in 100% steam at 730° C. and then cooled for evaluation of their physical properties. The catalyst granules had a bulk density of 944 grams per liter and a plate to plate crushing strength of 8.3 kilograms.

The catalyst was tested in a fixed bed pilot plant having a capacity for 6.8 liters of catalyst and molten salt for temperature control. The gas oil was a 55–87 volume percent fraction of East Texas crude oil. The basic data relating to these cracking runs are shown in the following table.

TABLE

| Run Number | 8 | 9 | 10 | 11 | 12 |
|---|---|---|---|---|---|
| Operating Conditions: | | | | | |
| Space Rate, Vol./Hr./Vol | 3.1 | 2.0 | 1.6 | 3.0 | 2.5 |
| Cat./Oil Ratio, Vol./Vol | 2.9 | 3.8 | 6.4 | 2.9 | 2.7 |
| Temperature, ° C.: | | | | | |
| Average Catalyst Bed | 482 | 485 | 482 | 507 | 510 |
| Salt | 493 | 496 | 496 | 527 | 529 |
| Pressure, p.s.i.g | 10 | 10 | 10 | 10 | 10 |
| Steam, wt. percent | 10 | 10 | 10 | 10 | 10 |
| Time On-Steam, Min | 6.7 | 8.0 | 6.0 | 8.2 | 9.0 |
| Yields, wt. percent: | | | | | |
| Conversion | 46.6 | 55.4 | 69.3 | 48.3 | 53.8 |
| Gasoline (196° C. at 90%) | 34.0 | 38.2 | 43.2 | 32.7 | 34.8 |
| Catalytic Gas Oil | 53.4 | 44.6 | 30.7 | 51.7 | 46.2 |
| $C_2$ Cut | 6.4 | 8.4 | 12.7 | 7.6 | 9.3 |
| Dry Gas | 4.7 | 6.5 | 9.9. | 6.5 | 7.9 |
| Coke (Incl. 7% $H_2$) | 1.5 | 2.3 | 3.5 | 1.5 | 1.8 |
| Light Products Breakdown (wt. percent): | | | | | |
| n-Butane | 0.5 | 0.8 | 1.3 | 0.6 | 1.0 |
| i-Butane | 2.6 | 3.1 | 5.9 | 3.0 | 3.6 |
| n-Butene | 3.3 | 4.5 | 5.5 | 4.0 | 4.7 |
| i-Butene | | | | | |
| Propane | 0.9 | 1.0 | 2.0 | 1.2 | 1.5 |
| Propene | 2.7 | 3.8 | 5.6 | 3.5 | 4.4 |
| Ethane | 0.4 | 0.5 | 0.7 | 0.6 | 0.7 |
| Ethene | 0.3 | 0.5 | 0.8 | 0.6 | 0.6 |
| Methane | 0.3 | 0.5 | 0.7 | 0.5 | 0.6 |
| Hydrogen | 0.06 | 0.10 | 0.10 | 0.07 | 0.08 |
| $H_2S$ | 0.01 | 0.02 | | | |

INSPECTION OF $C_5$+ GASOLINE CUT

| | | | | | |
|---|---|---|---|---|---|
| Density, g./ml | 0.759 | 0.756 | 0.756 | 0.761 | 0.762 |
| Distillation, ° C.: | | | | | |
| IBP | 43 | 42 | 44 | 43 | 43 |
| 5% | 55 | 55 | 54 | 54 | 54 |
| 10% | 62 | 61 | 58 | 60 | 60 |
| 20% | 71 | 69 | 66 | 69 | 69 |
| 30% | 82 | 79 | 74 | 78 | 78 |
| 40% | 94 | 93 | 86 | 93 | 92 |
| 50% | 113 | 111 | 104 | 111 | 111 |
| 60% | 131 | 130 | 125 | 131 | 132 |
| 70% | 149 | 150 | 147 | 150 | 153 |
| 80% | 172 | 169 | 170 | 173 | 173 |
| 90% | 194 | 196 | 200 | 199 | 200 |
| 95% | 208 | 213 | 216 | 212 | 216 |
| EP | 223 | 225 | 229 | 226 | 228 |
| Recovery | 98.0 | 98.0 | 97.8 | 98.0 | 97.8 |
| Loss+Residue | 2.0 | 2.0 | 2.2 | 2.0 | 2.2 |
| Octane Ratings: | | | | | |
| F-1 Clear | 92.7 | 92.9 | 93.1 | 94.0 | 94.5 |
| F-1+cc. TEL | 98.0 | 98.5 | 98.8 | 98.6 | 98.9 |

Similar evaluations were made of commercial kaolin catalyst manufactured by reductively desulfating particles formed from a mixture of sulfuric acid and kaolin. A series of graphs were made to show the effect of variables such as space rate and catalyst to oil ratios using the two types of catalysts. These graphs were interpolated in making a fair comparison between the effectiveness of kaolin catalyst and the aluminum zeolite catalyst. The data relating to this comparison are as follows:

| Temp., ° C. | 482 | | 482 | | 510 | |
| --- | --- | --- | --- | --- | --- | --- |
| | Kaolin | Invention | Kaolin | Invention | Kaolin | Invention |
| Conv., Vol. percent | | 55 | 48.2 | 65.2 | | 55 |
| $C_5^+$ Gaso., Vol. percent | 39.0 | 43.7 | 36.0 | 48.2 | 37.0 | 40.7 |
| Coke, Wt. percent | 4.0 | 2.1 | 3.0 | | 4.0 | 1.9 |
| $C_4$ Cut, Vol. percent | 14.6 | 12.4 | 11.5 | 16.6 | 14.6 | 14.1 |
| Dry Gas. Wt. percent | 7.2 | 6.3 | 6.0 | 8.4 | 8.8 | 8.0 |

The catalyst of the present invention permits the production of larger amount of iso-$C_4$'s at 482° C. then produced by the kaolin catalyst. At a 482° C. cracking temperature, the comparison of the gas production with the two catalysts is as follows:

| | Kaolin | Invention |
| --- | --- | --- |
| $C_4$ Breakdown, Vol. Percent Cut: | | |
| Normal butane | 11 | 9 |
| Isobutane | 33 | 43 |
| Butenes | 56 | 48 |
| Dry Gas Breakdown, Wt. Percent Cut: | | |
| Propane | 19 | 18 |
| Propene | 49 | 57 |
| Ethene | 12 | 8 |
| Ethane | 6 | 8 |
| Methane | 13 | 8 |
| Hydrogen | 1 | 1 |

Accordingly, the data indicate that the production of marketable products using such catalyst has important commercial advantages over the products obtained using such commercial available kaolin cracking catalyst.

EXAMPLE II

An aqueous ammonium nitrate was employed in dealkalizing a sample of sodium zeolite Y, and the ammonium zeolite Y was thereafter ion exchanged with aqueous aluminum nitrate to prepare an aluminum zeolite Y equivalent to that of Example I. A mixture of 80% kaolin and 20% aluminum zeolite Y was cast into pellets which were calcined. The catalyst particles were activated for 5 hours at 730° C. in a mixture of 10% steam and 90% air. The evaluation of the catalyst using the described Catalyst Evaluation Procedure provided data as follows:

| SR | Gasoline | Coke | Gas | Gas Gravity | Conversion | Selectivity |
| --- | --- | --- | --- | --- | --- | --- |
| 1 | 51.4 | 6.3 | 27.4 | 1.56 | 78.9 | 59 |
| 3 | 58.0 | 4.9 | 23.6 | 1.66 | 79.6 | 57 |

Such data indicated that aluminum zeolite Y in a clay carrier is an interesting cracking catalyst.

By a series of tests, it is established that the plastic clay employed as the carrier should produce a sturdy and sorptive pellet containing less than 1.0% and preferably less than 0.5% iron (usually present as compounds of iron) when treated in 100% steam for 4 hours at 730° C. Several varieties of clay, including halloysite, dealkalized bentonite, kaolin, and ball clay are found to be satisfactory.

EXAMPLE III

Samples of sodium zeolite Y were converted to aluminum zeolite Y by both the standard indirect procedure (involving initial formation of ammonium zeolite Y) and by a direct procedure involving ion exchange of the sodium zeolite with an aqueous solution of aluminum nitrate. Several catalysts consisting of aluminum zeolite in clay were prepared using various modifications of the procedure described in connection with Example I. Several catalysts were prepared to show the effect of varying the concentration of aluminum zeolite Y. The catalysts were evaluated in the presence of 10% steam by the described procedure to obtain the following data:

| Code | Percent Sieve | Vol. Percent Gasoline | Wt. Percent Conversion |
| --- | --- | --- | --- |
| A | 10 | 50.5 | 65.8 |
| B | 10 | 54.1 | 70.3 |
| C | 10 | 56.2 | 75.3 |
| D | 5 | 52.4 | 63.6 |
| E | 20 | 55.8 | 76.3 |

By a series of tests it is established that the concentration of aluminum zeolite Y in the refractory porous clay should be from 5% to 20% of the catalyst particle.

EXAMPLE IV

A variety of sodium zeolitic molecular sieves have been described in the literature and more can be imagined by chemists skilled in molecular sieve technology. Not all molecular sieve materials are suitable for conversion into the aluminum zeolitic molecular sieve material required for the present invention. Both the sodium form and aluminum form derived therefrom by ion exchange (either indirectly through the ammonium zeolite or less desirably directly through treatment with aqueous aluminum nitrate) must have an average pore diameter within the range from 10 to 18 angstroms. The silicon atom aluminum atom unit ratio in the sodium zeolitic structure (excluding any ion-exchangeable aluminum) must be within the range from 1.5 to 8. Interesting results are obtained using such aluminum zeolitic molecular sieve in clay particles as cracking catalysts.

Obviously many modifications and variations of the invention as hereinbefore set forth may be made without departing from the spirit and scope thereof, and therefore only such limitations should be imposed as are indicated in the appended claims.

The invention claimed is:

1. A cracking catalyst consisting of 80–95% attrition resistant porous kaolin refractory carrier containing less than 0.5% iron and from 5 to 20% component designated as aluminum zeolite Y by reason of the prior ion exchange treatment of a precursor with an aqueous solution of an aluminum salt prior to steam treatment of the cracking catalyst.

2. The method of making a cracking catalyst consisting essentially of: calcining particles for the production of a composition consisting of about 80 to 95% calcined kaolin containing less than 0.5% iron, and about 5 to 20% to component derived from aluminum zeolite Y, an ion-exchange treatment having converted sodium zeolite Y to an ammonium zeolite Y, and a second ion-exchange treatment having subjected such ammonium zeolite Y to an aqueous solution of an aluminum salt to provide a component designated as aluminum zeolite Y; activating the calcined particles by treatment with an atmosphere containing from 10% to 100% steam at a temperature within the range from 700° C. to 750° C. for a period of from 2 to 6 hours; and cooling the thus activated particles to provide attrition resistant particles containing 5 to 20% component derived from aluminum zeolite Y.

3. The method of making a cracking catalyst consisting of subjecting the sodium form of a zeolitic molecular sieve material having a unit ratio of silicon atoms to aluminum atoms within the range from 1.5 to 8 and an average pore diameter within the range from 10 to 18 angstroms to ion exchange to substitute aluminum ions at least indirectly for the exchangeable sodium ions to prepare an aluminum zeolitic molecular sieve; dispersing aluminum zeolitic molecular sieve in a quantity of clay at least four but less than nineteen times the quantity of aluminum zeolitic sieve said clay containing less than 0.5% iron; forming particles of a damp mixture of said clay and aluminum zeolitic molecular sieve; calcining the particles; activating the calcined particles by treatment in an atmosphere containing from 10% to 100% steam at a temperature within the range from 700° C. to 750° C. for from 2 to 6 hours; and cooling the thus activated particles to provide attrition resistant particles containing 5–20% component derived from aluminum zeolitic molecular sieve.

References Cited

UNITED STATES PATENTS

| | | | |
|---|---|---|---|
| 2,973,327 | 2/1961 | Mitchell et al. | 252—455 X |
| 3,224,167 | 12/1965 | Jones et al. | 252—455 X |
| 3,244,643 | 4/1966 | Schwartz | 252—455 |
| 3,262,890 | 7/1966 | Mitchell et al. | 252—455 |

DANIEL E. WYMAN, Primary Examiner

C. F. DEES, Assistant Examiner

U.S. Cl. X.R.

23—112; 208—120

PO-1050
(5/69)

UNITED STATES PATENT OFFICE
CERTIFICATE OF CORRECTION

Patent No. 3,455,842          Dated July 15, 1969

Inventor(s) E. B. Cornelius, J. E. McEvoy, G. A. Mills

It is certified that error appears in the above-identified patent and that said Letters Patent are hereby corrected as shown below:

Col. 1, line 37, "the" should read --that--

Col. 1, line 57, "in" should read --is--

Col. 1, line 62, "minimum" should read --minum--

Col. 1, line 64, "gear" should read --greater--

Col. 2, line 41, "$C_2$" should read --$C_4$--

Col. 2, line 42, "99." should read --9.9--

Col. 2, line 48, "0.5" should read --0.6--

Col. 3, line 22, "then" should read --than--

Col. 3, line 40, "commercial" should read --commercially--

SIGNED AND
SEALED
APR 28 1970

(SEAL)
Attest:

Edward M. Fletcher, Jr.
Attesting Officer

WILLIAM E. SCHUYLER, JR
Commissioner of Patents